United States Patent
Fyke et al.

(10) Patent No.: US 9,454,516 B2
(45) Date of Patent: Sep. 27, 2016

(54) METHOD AND HANDHELD ELECTRONIC DEVICE EMPLOYING A TOUCH SCREEN FOR AMBIGUOUS WORD REVIEW OR CORRECTION

(75) Inventors: Steven H. Fyke, Waterloo (CA); Peter La, Mississauga (CA); Alen Mujkic, Mississauga (CA); Michal Rybak, Upper Mount Standfast (BB); Richard Sibley, Kitchener (CA); Neil Adams, Waterloo (CA); Vadim Fux, Waterloo (CA); Shannon White, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 2056 days.

(21) Appl. No.: 12/013,894

(22) Filed: Jan. 14, 2008

(65) Prior Publication Data
US 2009/0182552 A1    Jul. 16, 2009

(51) Int. Cl.
*G06F 17/20*    (2006.01)
*G06F 17/24*    (2006.01)
(Continued)

(52) U.S. Cl.
CPC ............ *G06F 17/24* (2013.01); *G06F 3/0488* (2013.01); *G06F 17/273* (2013.01)

(58) Field of Classification Search
CPC ........ G06F 17/20; G06F 17/21; G06F 17/24; G06F 17/27; G06F 17/273; G06F 17/2735
USPC ........ 704/1, 2, 9, 10; 345/156, 168, 167, 69, 345/171, 173; 341/22
See application file for complete search history.

(56) References Cited

U.S. PATENT DOCUMENTS 5,818,437 A * 10/1998 Grover et al. ................. 715/811
5,953,541 A    9/1999 King et al.
(Continued)

FOREIGN PATENT DOCUMENTS

EP    1 050 794 A2    11/2000
EP    1 679 582 A1    7/2006
(Continued)

OTHER PUBLICATIONS

Blandford, Vivienne, "How to achieve 20 words per minute with Predictive Text!", http://www.allaboutsymbian.com/news/item/3843_How_to_achieve_20_words_per_mi.php, May 14, 2006, 2 pp.
(Continued)

*Primary Examiner* — Paras D Shah
(74) *Attorney, Agent, or Firm* — Fish & Richardson P.C.

(57) ABSTRACT

A method of ambiguous word review or correction for a handheld electronic device includes receiving a plurality of actuations of input members in which each of a number of these members has a plurality of assigned characters, rendering a plurality of words responsive to the actuations, displaying a plurality of representations of the words, and detecting a number of the words, which are ambiguous. For each of the detected number, a visual indicator is displayed associated with a corresponding one of the representations. Touching of a touch screen is detected in connection with the displayed visual indicator. Preferably, a first magnification of the corresponding representation and a second magnification of a representation of a number of alternative words are displayed. The touch screen can be used to select one of the first and second magnifications to correct the ambiguous word.

25 Claims, 11 Drawing Sheets

(51) Int. Cl.
*G06F 3/0488* (2013.01)
*G06F 17/27* (2006.01)

(56) References Cited

U.S. PATENT DOCUMENTS

| | | | |
|---|---|---|---|
| 6,011,554 A | 1/2000 | King et al. | |
| 6,233,545 B1 | 5/2001 | Datig | |
| 6,282,507 B1* | 8/2001 | Horiguchi et al. | 704/3 |
| 6,636,162 B1 | 10/2003 | Kushler et al. | |
| 6,646,573 B1 | 11/2003 | Kushler et al. | |
| 6,692,170 B2* | 2/2004 | Abir | 400/472 |
| 6,760,695 B1 | 7/2004 | Kuno et al. | |
| 6,789,231 B1* | 9/2004 | Reynar et al. | 715/256 |
| 6,801,659 B1 | 10/2004 | O'Dell | |
| 7,030,863 B2 | 4/2006 | Longe et al. | |
| 7,516,404 B1* | 4/2009 | Colby | 715/257 |
| 2004/0179044 A1* | 9/2004 | Carter | G06F 17/214 715/865 |
| 2005/0162395 A1 | 7/2005 | Unruh | |
| 2005/0169527 A1 | 8/2005 | Longe et al. | |
| 2005/0283358 A1* | 12/2005 | Stephanick | G06F 3/0233 704/7 |
| 2005/0283726 A1* | 12/2005 | Lunati | 715/533 |
| 2006/0007120 A1 | 1/2006 | Fux et al. | |
| 2006/0007121 A1 | 1/2006 | Fux et al. | |
| 2006/0073818 A1* | 4/2006 | Scott | 455/418 |
| 2006/0206815 A1* | 9/2006 | Pathiyal et al. | 715/533 |
| 2006/0265208 A1* | 11/2006 | Assadollahi | 704/9 |
| 2006/0274051 A1 | 12/2006 | Longe et al. | |
| 2007/0040813 A1 | 2/2007 | Kushler et al. | |
| 2007/0106937 A1* | 5/2007 | Cucerzan et al. | 715/533 |
| 2007/0236450 A1* | 10/2007 | Colgate et al. | 345/156 |
| 2008/0010054 A1 | 1/2008 | Fux | |
| 2008/0244388 A1* | 10/2008 | Fux et al. | 715/257 |
| 2008/0244446 A1* | 10/2008 | LeFevre et al. | 715/810 |
| 2008/0270896 A1* | 10/2008 | Kristensson | 715/261 |

FOREIGN PATENT DOCUMENTS

| | | |
|---|---|---|
| EP | 1 843 254 A1 | 10/2007 |
| WO | WO 98/33111 A1 | 7/1998 |
| WO | WO 00/30068 A1 | 5/2000 |
| WO | WO 00/43208 A3 | 7/2000 |
| WO | WO 2004/051392 A2 | 6/2004 |

OTHER PUBLICATIONS

Mobile Data Association, "Predictive Text What is Predictive Texting?", http://www.text.it/howto.cfm, 2006-2007, 1 p.
Apple, Inc., "iPhone User's Guide", http://manuals.info.apple.com/en/iPhone_User_Guide.pdf, 2007, 2 pp.
Office Action, dated Dec. 15, 2011, in corresponding Canadian Application No. 2,644,804 (4 pages).
European Search Report for EP Application No. 08150238.7 dated Jun. 13, 2008, 13 pages.
Communication in EP Application No. 08150238.7 dated Dec. 12, 2009, 14 pages.
Summon to Oral Proceedings in EP Application No. 08150238.7, dated Apr. 8, 2013, 12 pages.

* cited by examiner

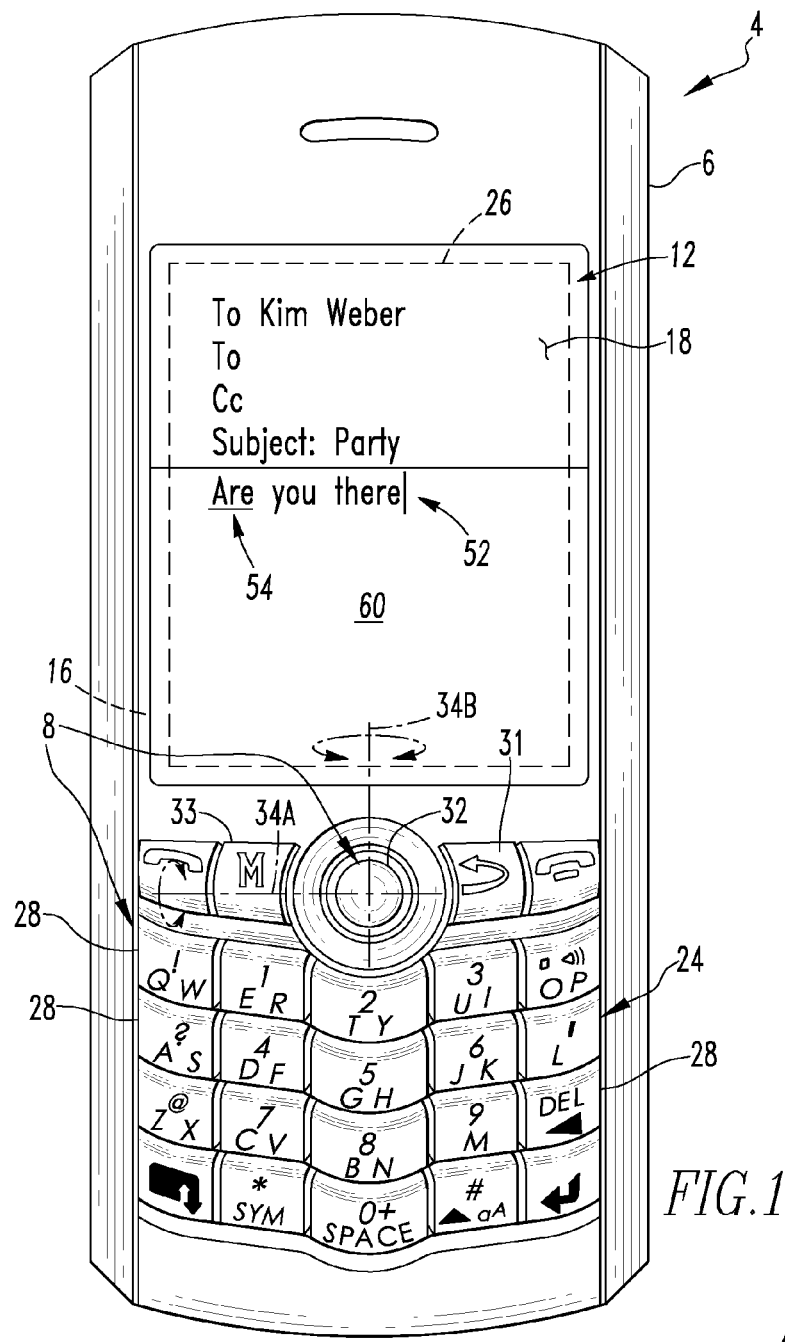
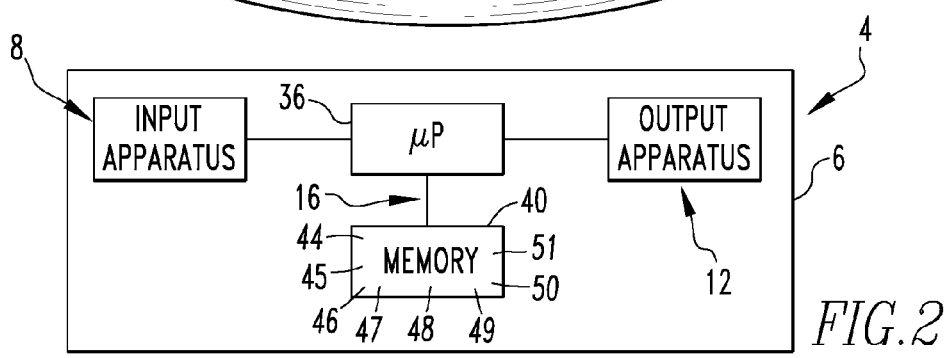

METHOD AND HANDHELD ELECTRONIC DEVICE EMPLOYING A TOUCH SCREEN FOR AMBIGUOUS WORD REVIEW OR CORRECTION

BACKGROUND

1. Field

The disclosed and claimed concept relates generally to handheld electronic devices and, more particularly, to handheld electronic devices and methods that enable ambiguous word review or correction using a touch screen.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices. Such handheld electronic devices are generally intended to be portable, and thus are of a relatively compact configuration in which keys and other input structures often perform a plurality of functions under certain circumstances or may otherwise have a plurality of aspects or features assigned thereto. As a practical matter, the keys of a keypad can only be reduced to a certain small size before the keys become relatively unusable. In order to enable text entry, however, a keypad must be capable of entering all twenty-six letters of the Roman alphabet, for instance, as well as appropriate punctuation and other symbols.

One way of providing numerous letters in a small space has been to provide a "reduced keyboard" in which a plurality of letters, symbols, and/or digits, and the like, are assigned to any given key. For example, a touch-tone telephone includes a reduced keypad by providing twelve keys, of which ten have digits thereon, and of these ten keys eight have Roman letters assigned thereto. For instance, one of the keys includes the digit "2" as well as the letters "A", "B", and "C". Other known reduced keyboards have included other arrangements of keys, letters, symbols, digits, and the like. Since a single actuation of such a key potentially could be intended by the user to refer to any of the letters "A", "B", and "C", and potentially could also be intended to refer to the digit "2", the input generally is an ambiguous input and is in need of some type of disambiguation in order to be useful for text entry purposes.

In order to enable a user to make use of the plural letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. Another example keystroke interpretation system is key chording, of which various types exist. For instance, a particular character can be entered by pressing two keys in succession or by pressing and holding first key while pressing a second key. Still another keystroke interpretation system is a "press-and-hold/press-and-release" interpretation function in which a given key provides a first result if the key is pressed and immediately released, and provides a second result if the key is pressed and held for a short period of time.

Another keystroke interpretation system is a software-based text disambiguation function. In such a system, a user typically presses keys to which one or more characters have been assigned, generally pressing each key one time for each desired letter, and the disambiguation software attempts to predict the intended input. Numerous different systems have been proposed. See, for example, U.S. Patent Application Publication Nos. 2006/0007120 and 2006/0007121; and U.S. Pat. No. 5,953,541. For example, as a user enters keystrokes, the device provides output in the form of a default output and a number of variants from which a user can choose. The output is based largely upon the frequency, i.e., the likelihood that a user intended a particular output, but various features of the device provide additional variants that are not based solely on frequency and rather are provided by various logic structures resident on the device. The device enables editing during text entry and also provides a learning function that allows the disambiguation function to adapt to provide a customized experience for the user. Additionally, the device can facilitate the selection of variants by displaying a graphic of a special <NEXT> key of the keypad that enables a user to progressively select variants generally without changing the position of the user's hands on the device.

Some handheld electronic devices employ a reduced keyboard and disambiguation software with a word list of over, for example, 35,000 words and the ability to increase that list based on the frequency of use and the names and addresses in a local address book. When typing on such a device, it is not uncommon to have a key sequence represent multiple possible words (e.g., "are" and "see" are the result of the same key sequence). If composing a message, for example, the result is that the sender may have to carefully watch what is being entered as it is typed, and perhaps review the message when it is finished to make sure the correct words have been used. If the sender doesn't do this, then the message could contain unintended alternative words, and the receiver would then need to try and make sense of the errors in the message. This is especially bad if the receiver is unaware that a reduced keyboard and disambiguation software was used with the original message because that receiver wouldn't be expecting unintended word replacements in the message.

Some handheld electronic devices employ keyboards and disambiguation or predictive software that works so well that the user's typed message is often determined correctly even if the user completely ignores displayed lists of suggested words. Since typing is faster if the user ignores the displayed lists of suggested words and since the message is usually determined correctly anyway, the user may get in the habit of ignoring the displayed lists of suggested words. However, there are certain combinations of words that such devices do get wrong. Examples of such suspect word combinations include: have/gave; see/are; about/snout; yet/try; hate/gate; there/three; test/tray; dear/fear; hit/guy; info/undo; is/us; yes/tea; sick/suck; busy/bust; but/bit/buy/nut/nit. For example, the problem with the word combination including "have" and "gave" is caused by a keyboard key that includes both of the letters "h" and "g". Also, the device may not get certain words correct if they are not in the device's dictionary. Hence, because of the user's habit of ignoring displayed lists of suggested words, the user may end up sending an incorrect message or spending extra time to review the message after composition.

With disambiguation and other predictive text input methods, there are several times that the handheld electronic device can choose an incorrect word when two words are ambiguous and interchangeable. For example, there are the phrases: "Are you there?" and "See you there!". This includes the above-described suspect word combination: see/are.

There is room for improvement in handheld electronic devices.

There is also room for improvement in methods of reviewing or correcting ambiguous words.

BRIEF DESCRIPTION OF THE DRAWINGS

A full understanding of the disclosed and claimed concept can be gained from the following description of the preferred embodiments when read in conjunction with the accompanying drawings in which:

FIG. 1 is a top plan view of an improved handheld electronic device in accordance with the disclosed and claimed concept after a first string of input member actuations.

FIG. 2 is a block diagram in schematic form of the handheld electronic device of FIG. 1.

Similar numerals refer to similar parts throughout the specification.

DESCRIPTION

Figure 3:
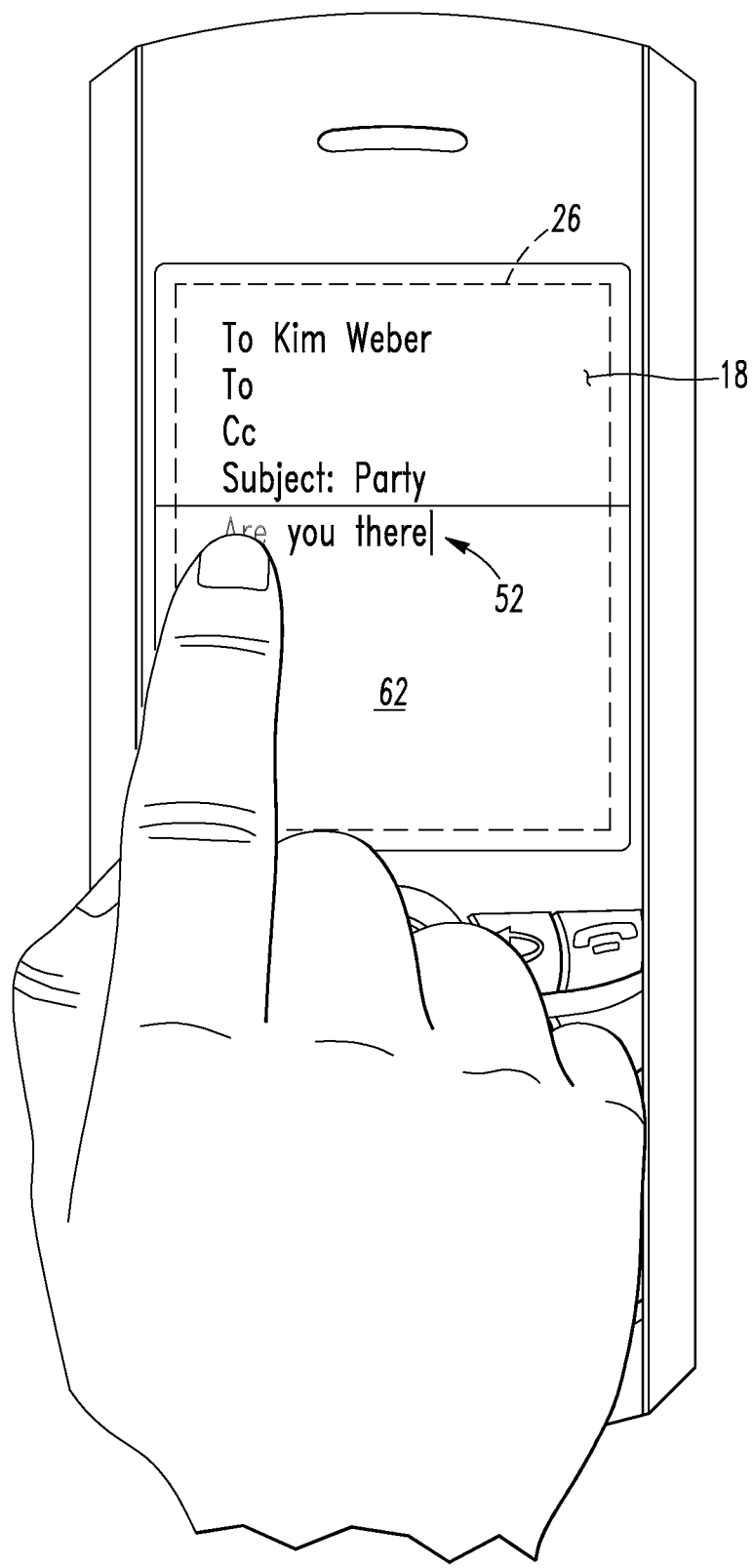
FIGS. 3-5, 6A and 6B are top plan views of the handheld electronic device of FIG. 1 showing other display screens and/or user interaction therewith.

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

As employed herein, the term "magnification" means the act or state of being enlarged in appearance. A non-limiting example of magnification is the display of a word, other term or character in a relatively larger size (e.g., font size; height; width; height and width) than the size (e.g., font size; height; width; height and width) of the previously displayed such word, other term, character or other contemporaneously displayed word(s) and/or term(s) and/or character(s).

As employed herein, the term "highlighted" means to cause a displayed item (e.g., text; word(s); term(s); character(s)) to be displayed in a way that stands out (e.g., without limitation: underlined; bolded; italicized; blinking; flashing; displayed in a different color than other displayed item(s); displayed in a different font than other displayed item(s); displayed suitably differently than other displayed item(s)) on a display, such as a display screen or other output apparatus.

As employed herein, the term "visual indicator" means a displayed item, representation or modification of a displayed item (e.g., text; word(s); term(s); character(s)) that causes it to stand out, to be pointed out, to be highlighted, or otherwise noticed.

As employed herein, the term "ambiguous" means capable of being understood in two or more possible ways. Non-limiting examples of ambiguous terms include words that could be mistakenly spelled out incorrectly, words that could be used incorrectly in a sentence (e.g., without limitation, "their", "there" or "they're"; "see" or "are"), input member (e.g., without limitation, key) combinations that result in a plurality of dictionary matches, or input member combinations that have no dictionary matches.

In accordance with one aspect of the disclosed and claimed concept, a method of ambiguous word review or correction is for a handheld electronic device including a display apparatus, a touch screen apparatus operatively associated with the display apparatus, and an input apparatus having a plurality of input members, each of a number of the input members having a plurality of characters assigned thereto. The method comprises: receiving a plurality of actuations of the input members; rendering a plurality of words responsive to the actuations of the input members; displaying at the display apparatus a plurality of representations of the words; detecting a number of the words, which are ambiguous; for at least a number of the detected number of the words, displaying a visual indicator associated with a corresponding one of the representations for a corresponding one of the detected number of the words at the display apparatus; and detecting touching of the touch screen in connection with one of the displayed visual indicator.

The method can, responsive to the detecting touching of the touch screen, display at the display apparatus: (a) a first magnification of the corresponding one of the representations, and (b) a second magnification of a representation of a number of alternatives to the corresponding one of the detected number of the words.

The method can detect touching of the touch screen in connection with one of the representation of a number of alternatives to the corresponding one of the detected number of the words of the second magnification and responsively display a representation of one of the number of alternatives in place of the corresponding one of the representations.

As another aspect of the disclosed and claimed concept, a handheld electronic device comprises: a display apparatus; a touch screen apparatus operatively associated with the display apparatus; an input apparatus including a plurality of input members, each of a number of the input members having a plurality of characters assigned thereto; and a processor apparatus structured to receive a plurality of actuations of the input members, render a plurality of words responsive to the actuations of the input members, display at the display apparatus a plurality of representations of the words, detect a number of the words, which are ambiguous, for at least a number of the detected number of the words, display a visual indicator associated with a corresponding one of the representations for a corresponding one of the detected number of the words at the display apparatus, and detect touching of the touch screen in connection with one of the displayed visual indicator.

The processor apparatus can, responsive to detecting the touching of the touch screen, display at the display apparatus: (a) a first magnification of the corresponding one of the representations, and (b) a second magnification of a representation of a number of alternatives to the corresponding one of the detected number of the words.

The processor apparatus can detect touching of the touch screen in connection with one of the representation of a number of alternatives to the corresponding one of the detected number of the words of the second magnification and responsively display a representation of one of the number of alternatives in place of the corresponding one of the representations.

The display apparatus can comprise a virtual track ball; and the processor apparatus can be further structured to respond to selection of one of the first magnification and the second magnification responsive to the virtual track ball.

The processor apparatus can be further structured to edit the corresponding one of the representations responsive to the virtual track ball.

An improved handheld electronic device 4 is indicated generally in FIG. 1 and is depicted schematically in FIG. 2. The example handheld electronic device 4 includes a housing 6 upon which are disposed an input apparatus 8, an output apparatus 12, and a processor apparatus 16. The input apparatus 8 is structured to provide input to the processor apparatus 16, and the output apparatus 12 is structured to receive output signals from the processor apparatus 16. The output apparatus 12 comprises a display 18 that is structured to provide visual output, although other output devices such as speakers, LEDs, tactile output devices, and so forth can be additionally or alternatively used.

As can be understood from FIG. 1, the input apparatus 8 includes a keypad 24, a touch screen apparatus 26 (shown in hidden line drawing) operatively associated with the display 18, and a multiple-axis input device which, in the example embodiment depicted herein, is a track ball 32 that will be described in greater detail below. The keypad 24 comprises a plurality of keys 28 in the example form of a reduced QWERTY keyboard, meaning that at least some of the keys 28 each have a plurality of linguistic elements assigned thereto, with at least some of the linguistic elements being Latin letters arranged generally in a QWERTY configuration. The keys 28 and the track ball 32 all serve as input members that are actuatable to provide input to the processor apparatus 16. The keypad 24 and the track ball 32 are advantageously disposed adjacent one another on a front face of the housing 6. This enables a user to operate the track ball 32 substantially without moving the user's hands away from the keypad 24 during a text entry operation or other operation.

One of the keys 28 is an <ESCAPE> key 31 which, when actuated, provides to the processor apparatus 16 an input that undoes the action which resulted from the immediately preceding input and/or moves the user to a position logically higher within a logical menu tree managed by a graphical user interface (GUI) routine 46. The function provided by the <ESCAPE> key 31 can be used at any logical location within any portion of the logical menu tree except, perhaps, at a home screen (not shown in FIG. 1; but see FIG. 7). The <ESCAPE> key 31 is advantageously disposed adjacent the track ball 32 thereby enabling, for example, an unintended or incorrect input from the track ball 32 to be quickly undone, i.e., reversed, by an actuation of the adjacent <ESCAPE> key 31.

Another of the keys 28 is a <MENU> key 33 which, when actuated, provides to the processor apparatus 16 an input that causes the GUI 46 to generate and output on the display 18 a menu (not shown). Such a menu is appropriate to the user's current logical location within the logical menu tree.

While in the depicted example embodiment the multiple-axis input device is the track ball 32, it is noted that multiple-axis input devices other than the track ball 32 can be employed without departing from the disclosed and claimed concept. For instance, other appropriate multiple-axis input devices could include mechanical devices such as joysticks and the like and/or non-mechanical devices such as touch pads, track pads and the like and/or other devices which detect motion or input in other fashions, such as through the use of optical sensors or piezoelectric crystals.

The track ball 32 is freely rotatable in all directions with respect to the housing 6. A rotation of the track ball 32 a predetermined rotational distance with respect to the housing 6 provides an input to the processor apparatus 16, and such inputs can be employed by a number of routines, for example, as navigational inputs, scrolling inputs, selection inputs, and other inputs.

For instance, and as can be seen in FIG. 1, the track ball 32 is rotatable about a horizontal axis 34A to provide vertical scrolling, navigational, selection, or other inputs. Similarly, the track ball 32 is rotatable about a vertical axis 34B to provide horizontal scrolling, navigational, selection, or other inputs. Since the track ball 32 is freely rotatable with respect to the housing 6, the track ball 32 is additionally rotatable about any other axis (not expressly depicted herein) that lies within the plane of the page of FIG. 1 or that extends out of the plane of the page of FIG. 1.

The track ball 32 can be said to be a multiple-axis input device because it provides scrolling, navigational, selection, and other inputs in a plurality of directions or with respect to a plurality of axes, such as providing inputs in both the vertical and the horizontal directions. It is reiterated that the track ball 32 is merely one of many multiple-axis input devices that could be employed on the handheld electronic device 4. As such, mechanical alternatives to the track ball 32, such as a joystick, might have a limited rotation with respect to the housing 6, and non-mechanical alternatives might be immovable with respect to the housing 6, yet all are capable of providing input in a plurality of directions and/or along a plurality of axes.

The track ball 32 additionally is translatable toward the housing 6, i.e., into the plane of the page of FIG. 1, to provide additional inputs. The track ball 32 could be translated in such a fashion by, for example, a user applying an actuating force to the track ball 32 in a direction toward the housing 6, such as by pressing on the track ball 32. The inputs that are provided to the processor apparatus 16 as a result of a translation of the track ball 32 in the indicated fashion can be employed by the routines, for example, as selection inputs, delimiter inputs, or other inputs.

As can be seen in FIG. 2, the processor apparatus 16 comprises a processor 36 and a memory 40. The processor 36 may be, for instance and without limitation, a microprocessor (μP) that is responsive to inputs from the input apparatus 8 and that provides output signals to the output apparatus 12. The processor 36 interfaces with the memory 40.

The memory 40 can be said to constitute a machine-readable medium and can be any one or more of a variety of types of internal and/or external storage media such as, without limitation, RAM, ROM, EPROM(s), EEPROM(s), FLASH, and the like that provide a storage register for data storage such as in the fashion of an internal storage area of a computer, and can be volatile memory or nonvolatile memory. The memory 40 has stored therein the aforementioned number of routines which are executable on the processor 36. The routines can be in any of a variety of forms such as, without limitation, software, firmware, and the like. As will be explained in greater detail below, the routines include a spell checking routine 44, a disambiguation routine 45, and the aforementioned GUI 46, as well as other applications (routines), such as a conventional calendar application 47, a conventional task list application 48, a conventional e-mail application 49, or a "word checker" application 50, as will be described.

As is conventional, a number of the routines of the processor 36, such as for example and without limitation, routines 47,48,49, receive a plurality of actuations of the keys 28, render a plurality of words responsive to the actuations of the keys 28, and display at the display 18 a plurality of representations of the words. For example, the example e-mail application 49 has caused the display of word representations 52 of the text "Are you there".

Figure 4:
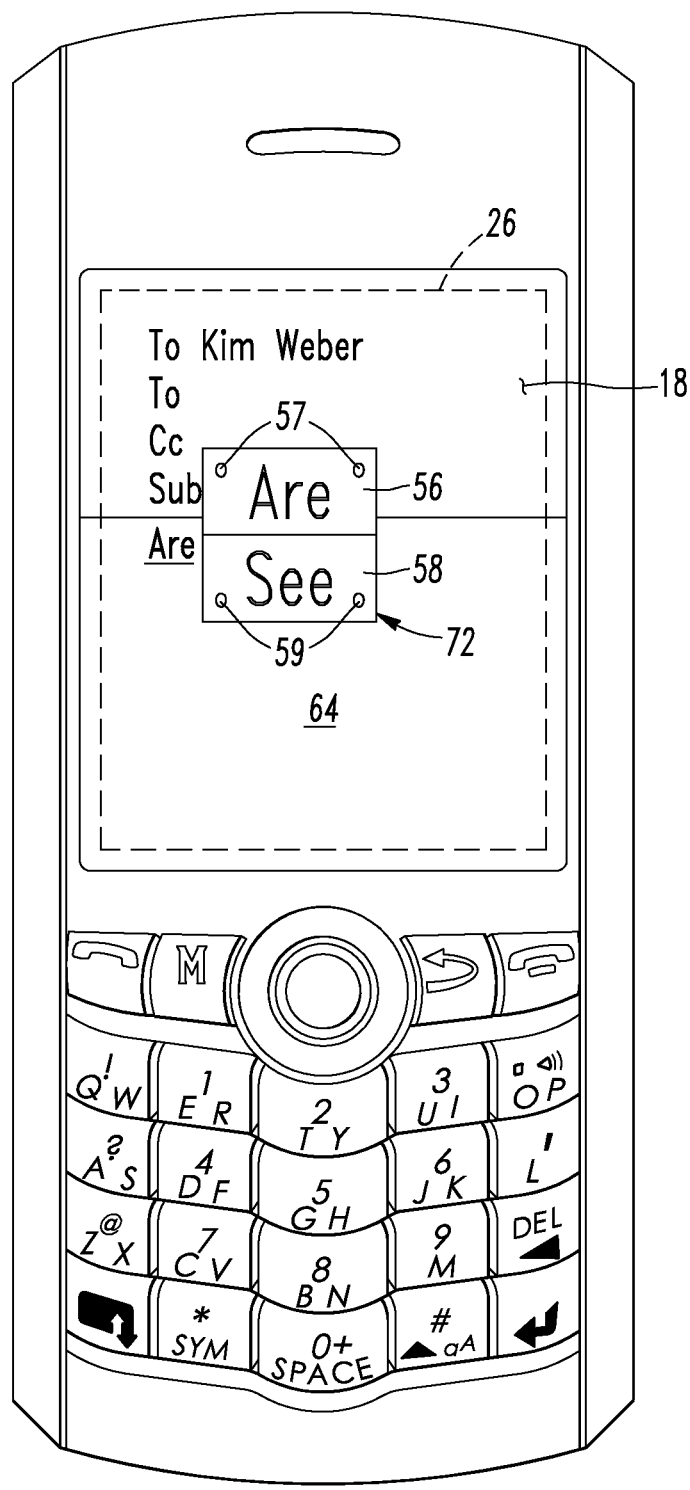

In accordance with an important aspect of the disclosed and claimed concept, another example processor routine 51 (FIG. 10) is structured to detect a number of the words of the example word representations 52, which are ambiguous. For example, in FIG. 1, the routine 51 has caused for one of those words ("Are"), the display of a visual indicator 54 associated with the word representation "Are" at the display 18. As shown in FIG. 3, the routine 51 detects touching of the touch screen 26 (shown in hidden line drawing) in connection with the example displayed visual indicator 54 and responsively displays at the display 18 (FIG. 4): a first magnification 56 of the word representation "Are", and a second magnification 58 of a representation of a number of alternatives to the word "Are". In this example, there is one alternative to the word "Are", namely, the word "See", as shown in FIG. 4.

While the example displayed visual indicator 54 of FIG. 1 is in the form of underlining, any suitable form of highlighting of any number of ambiguous words of the example word representations 52 may be employed.

Although FIG. 1 shows that the example e-mail application 49 has caused the display of a partial e-mail message including the text "Are you there", it will be appreciated that the word representations 52 can be part of a phrase, a sentence, a word, a paragraph, an entire composition, such as a full e-mail message, or can be part or all of another set of word representations 52 rendered by another application.

Referring to FIGS. 1, 3-5, 6A and 6B, different display screens 60,62,64,66,68,70 of the handheld electronic device 4 of FIG. 1 are shown. As has been discussed, the handheld electronic device 4 includes the touch screen 26 and the conventional input apparatus 8. In FIG. 1, the display screen 60 shows a partially composed e-mail message, which includes the text "Are you there". In this instance, an ambiguous word, such as "Are", or any other potential error in the composition, includes the example displayed visual indicator 54 (e.g., without limitation, underlining). This highlights when the handheld electronic device 4 is not able to disambiguate the input sequence of keys 28. For example, the sequence of keys 28 "A/S", "E/R" and "E/R" can form either the word "Are" or the word "See", thereby making "Are" ambiguous.

Figure 7:
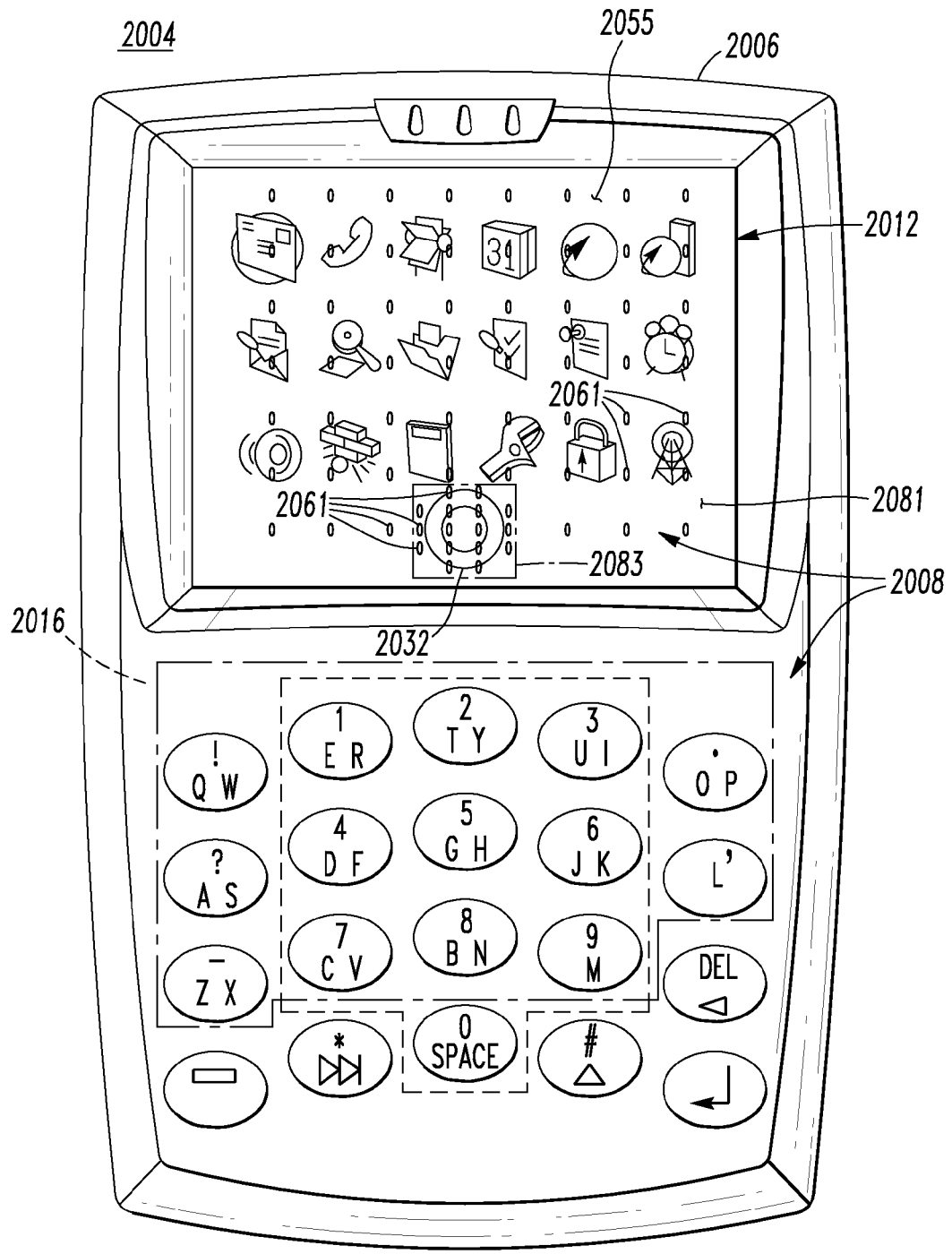
FIG. 7 is a top plan view of an improved handheld electronic device in accordance with another embodiment of the disclosed and claimed concept.

Next, as respectively shown in FIGS. 3 and 4, the user can select (e.g., by touching at or about the highlighted ambiguous word "Are" by using the touch screen 26 as shown in FIG. 3; or by using the virtual track ball 2032 as illustrated in FIG. 7 to position a cursor at the highlighted ambiguous word "Are" and to select the same) the example underlined ambiguous word "Are". Alternatively, the user can select by using the physical track ball 32 of FIG. 1 to position the cursor and select the ambiguous word. This brings up an example dialog box 72 (shown in FIG. 4) with a number of selectable alternatives to the word "Are", such as a number of possible corrections (e.g., one alternative "See" is shown, although a plurality of such possible corrections may be employed). This is employed after the composition of a word, a phrase, a sentence, a paragraph or the entire text (e.g., without limitation, of an e-mail message) is complete. The example dialog box 72 includes the first magnification 56 of the word representation "Are" and the second magnification 58 of the word representation "See".

Figure 5:
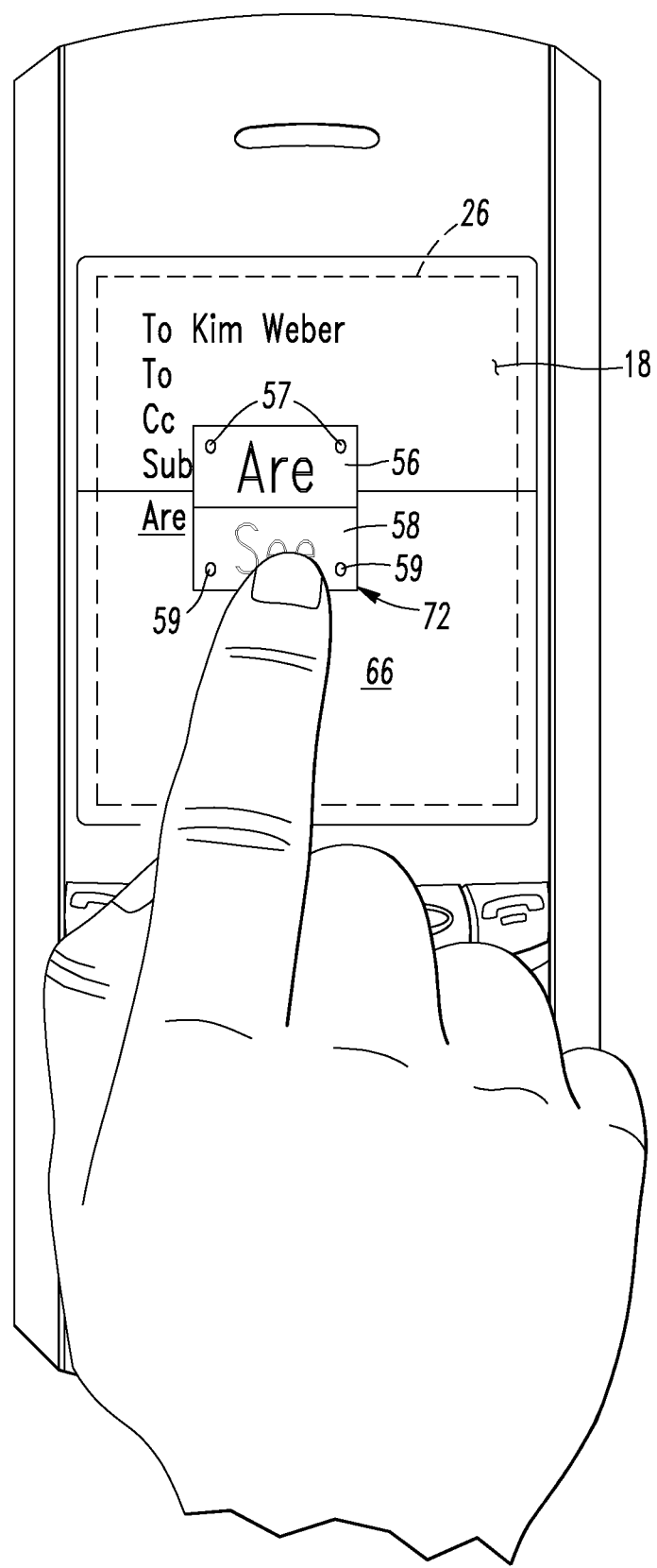

In this example, the user replaces the word "Are" in the word representations 52 (FIGS. 1 and 3) by selecting the word "See" from the dialog box 72 by touching the second magnification 58 of the word representation "See", as shown in FIG. 5. Alternatively, the user can make this selection by using the virtual track ball 2032 (FIG. 7) to position a cursor (not shown) at the second magnification 58 of the word representation "See" and to select the same. As another alternative, the user can make this selection by using the physical track ball 32.

Figure 6A:
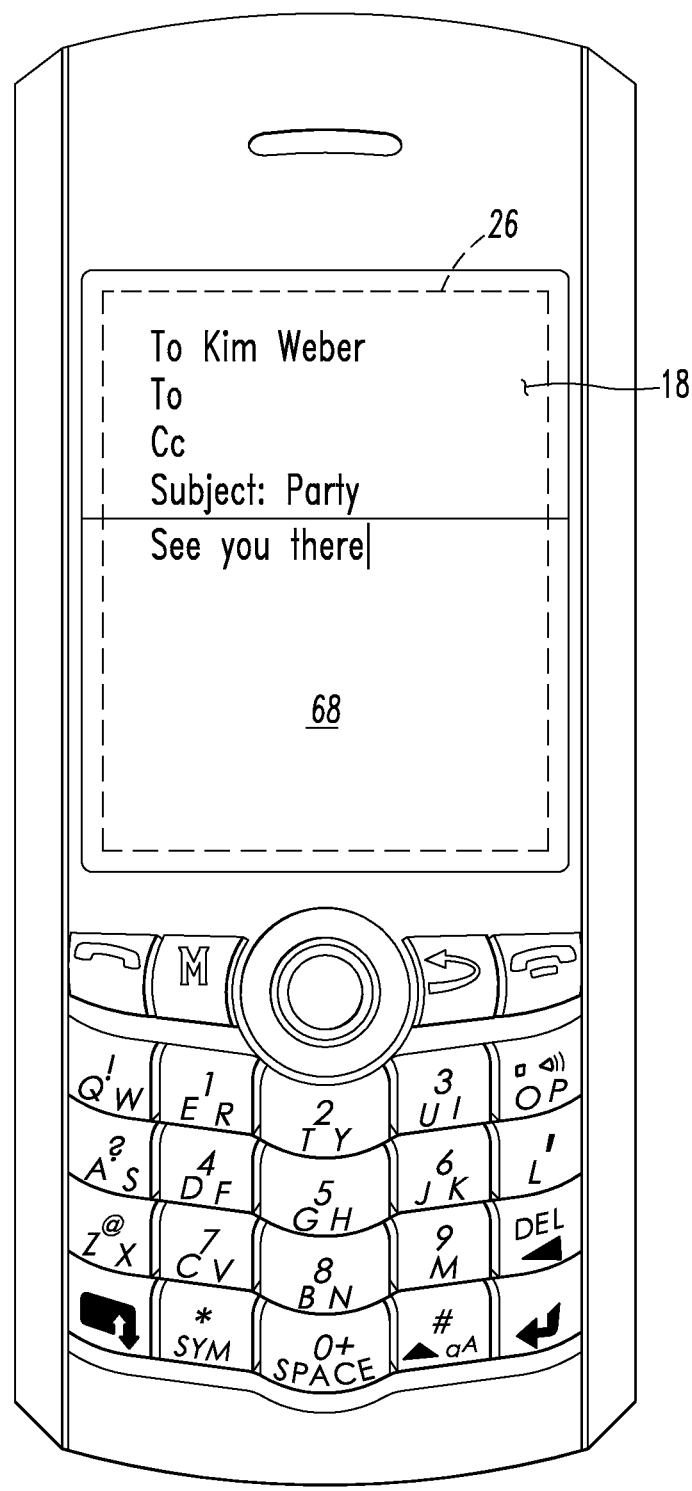

Finally, as shown in FIG. 6A, the word representation "See" replaces the word representation "Are" and the example underlined text style of the suspect word (e.g., "Are" of FIG. 1) is returned to a default text style (e.g., is no longer displayed in underlined type) with the selected word representation "See".

In summary, in this example, the user determined that the context of the text "Are you there" of the example word representations 52 (FIG. 1), should, instead, be "See you there" and responsively selected the word "See" from the dialog box 72 (FIG. 5). Preferably, as shown in FIGS. 4 and 5, the dialog box 72 is magnified with respect to the word representations 52. This magnification is provided to assist the user in readily distinguishing one of the example representations 52 from the other. In this manner, for instance, before the user sends out the example word representations 52 as part of an example e-mail message, the user can quickly glance over the entire composition (as shown in FIG. 1), choose any highlighted word (as shown in FIG. 3), review the alternative words (as shown in FIG. 4), and, optionally, change the same (as shown in FIGS. 5 and 6A). As shown in FIG. 6A, the visual indicator 54 (FIG. 1) has been removed after the selection and display of the alternative "See" of FIG. 5 in place of the ambiguous word "Are" of FIG. 1.

Figure 6B:
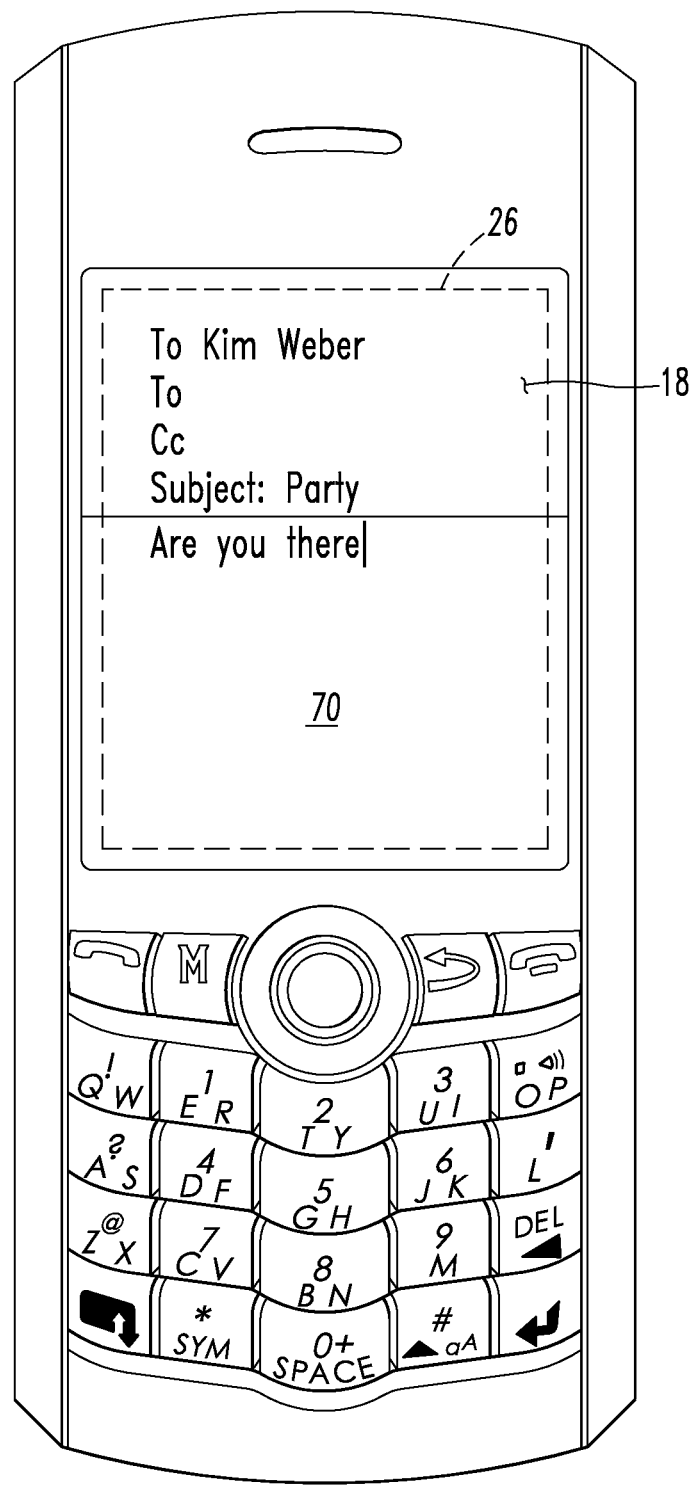

Alternatively, if the user chooses to retain the word "Are" in FIG. 5, by selecting the default portion as shown by the first magnification 56 of the word representation "Are", the text style of the suspect word (e.g., "Are") is returned to the default text style (e.g., is no longer displayed in underlined type) as shown in FIG. 6B.

Figure 8:
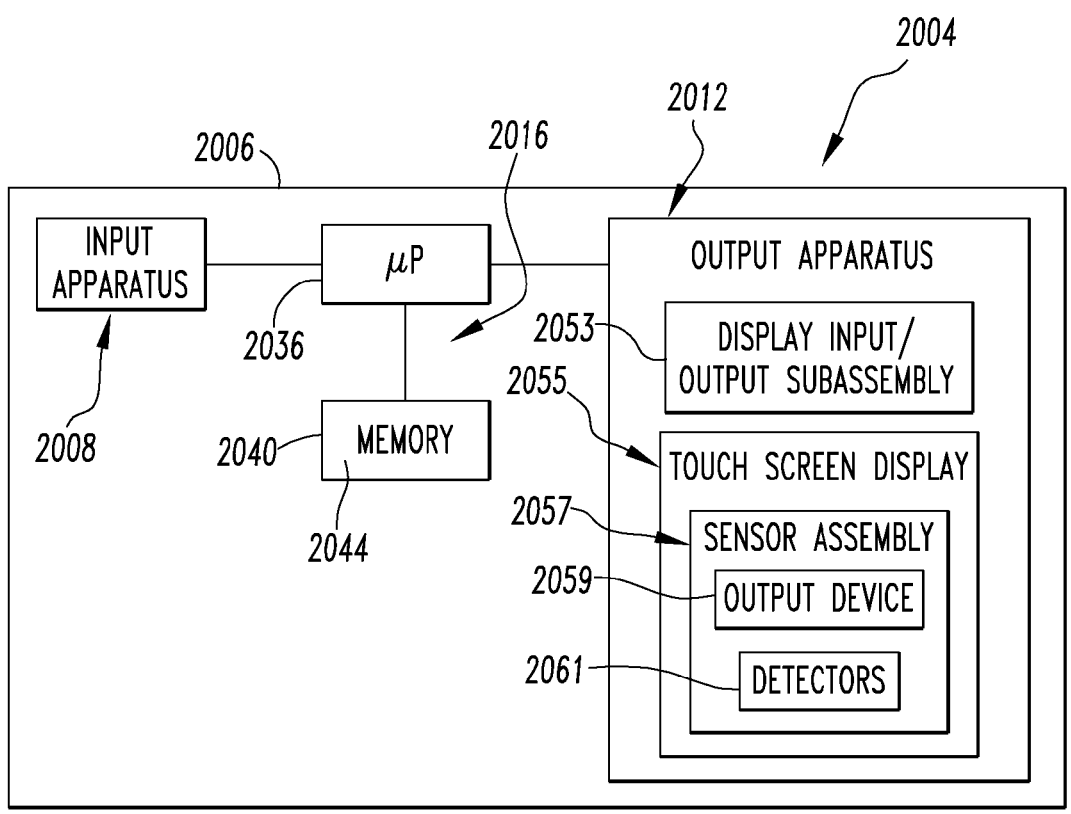
FIG. 8 is a block diagram in schematic form of the improved handheld electronic device of FIG. 7.

Another handheld electronic device 2004 is shown in FIGS. 7 and 8. The handheld electronic device 2004 includes a housing 2006 upon which are disposed an input apparatus 2008, an output apparatus 2012, and a processor apparatus 2016 (FIG. 8). The processor apparatus 2016 comprises a processor 2036 and a memory 2040 having stored therein a number of routines 2044. All of the operations that can be performed on or with the handheld electronic device 4 (FIG. 1) can be performed on or with the handheld electronic device 2004. As such, the features of the handheld electronic device 2004 that are common with the handheld electronic device 4, and this would comprise essentially all of the features of the handheld electronic device 4, will generally not be repeated.

As a general matter, the handheld electronic device 2004 is substantially identical in configuration and function to the handheld electronic device 4, except that the handheld electronic device 2004 includes a touch screen display 2055 that provides a non-mechanical multiple-axis input device 2032 instead of the track ball 32 (FIG. 1). The non-mechanical multiple-axis input device 2032 can be said to be in the form of a virtual track ball 2032.

As is generally understood, the touch screen display 2055 includes a liquid crystal layer between a pair of substrates, with each substrate including an electrode. The electrodes form a grid, which defines the aperture size of the pixels. When a charge is applied to the electrodes, the liquid crystal molecules of the liquid crystal layer become aligned generally perpendicular to the two substrates. A display input/output subassembly 2053 of the output apparatus 2012 controls the location of the charge applied to the electrodes, thereby enabling the formation of images on the touch screen display 2055.

Additionally, the touch screen display 2055 comprises a sensor assembly 2057, which comprises an output device 2059 and a plurality of detectors 2061. The detectors 2061 are shown schematically and are typically too small to be seen by the naked eye. Each detector 2061 is in electrical communication with the output device 2059 and creates an output signal when actuated. The detectors 2061 are disposed in a pattern, discussed below, and are structured to detect an external object immediately adjacent to, or touching, the touch screen display 2055. The external object is typically a stylus or a user's finger (not shown). The output device 2059 and/or the processor apparatus 2016 are structured to receive the detector signals and convert the signals to data representing the location of the external object relative to the touch screen display 2055. As such, while the sensor assembly 2057 is physically a component of the touch screen display 2055, it is nevertheless considered to be a logical component of the input apparatus 2008 since it provides input to the processor apparatus 2016.

The detectors 2061 are typically capacitive detectors, optical detectors, resistive detectors, or mechanical detectors such as strain gauge or charged grid, although other technologies may be employed without departing from the disclosed and claimed concept. Typically, capacitive detectors are structured to detect a change in capacitance caused by the electrical field of the external object or a change in capacitance caused by the compression of the capacitive detector. Optical detectors are structured to detect a reflection of light, e.g., light created by the touch screen display 2055. Mechanical detectors include a charged grid with columns that would be disposed on one side of the touch screen display 2055 and a corresponding grid without columns would be disposed at another location on the touch screen display 2055. In such a configuration, when the touch screen display 2055 is compressed, e.g., as a result of being touched by the user, the columns at the area of compression contact the opposing grid thereby completing a circuit.

Capacitive detectors may be disposed upon either substrate and, although small, require space. Thus, any pixel that is disposed adjacent a detector 2061 will have a reduced size, or aperture, to accommodate the adjacent detector 2061.

The detectors 2061 are disposed in a pattern, and at least some of the detectors 2061 preferably are arranged in lines that form a grid. A first portion of the detectors 2061 are disposed on a first area 2081 of the touch screen display 2055, and a second portion of the detectors 2061 are disposed on a second area 2083 of the touch screen display 2055. As can be seen from FIG. 7, the first area 2081 essentially is every region of the touch screen display 2055 other than the second area 2083.

The first portion of the detectors 2061 disposed on the first area 2081 of the touch screen display 2055 are disposed in a relatively sparse pattern in order to minimize the visual interference that is caused by the presence of the detectors 2061 adjacent the pixels. Preferably, the spacing of the detectors 2061 on the first area 2081 is between about 1.0 mm and 10.0 mm between the detectors 2061, and more preferably about 3.0 mm between the detectors 2061.

The second portion of the detectors 2061 are disposed in a relatively dense pattern on the second area 2083 of the touch screen display 2055 and are structured to support the function of the virtual track ball 2032. The image quality in the second area 2083 of the touch screen display 2055 is adversely affected due to the dense spacing of the detectors 2061 there. However, the second area 2083 is a relatively small area compared to the entire touch screen display 2055. Preferably, the density of the detectors 2061 in the second area 2083 is between about 0.05 mm and 3.0 mm between the detectors, and more preferably about 0.1 mm between the detectors 2061. Further, because the pixels in the second area 2083 are dedicated for the virtual track ball 2032, it is acceptable to have a reduced pixel density with larger pixels. Since the pixel size would be very large, the aspect ratio would be significantly higher than that of pixels that are not disposed adjacent a detector 2061. The pixels in the second area 2083 likely would be special function pixels, such as pixels that would both depict the virtual track ball 2032 and that would light up the second area 2083 to highlight the virtual track ball 2032.

The processor apparatus 2016 is structured to create images and define the boundaries of selectable portions of the images on the touch screen display 2055. For example, the processor apparatus 2016 will create the images of selectable icons or other objects on specific portions of the touch screen display 2055. The processor apparatus 2016 is further structured to relate specific detectors 2061 to the specific portions of the touch screen display 2055. Thus, when the processor apparatus 2016 detects the actuation of a specific detector 2061 adjacent to a specific image, e.g., a selectable icon, the processor apparatus 2016 will initiate the function or routine related to that icon, e.g., opening a calendar program.

Similarly, the processor apparatus 2016 is structured to employ specific detectors 2061 to support the function of the virtual track ball 2032 in the second area 2083 of the touch screen display 2055. Thus, actuations of one or more of the detectors 2061 that support the virtual track ball 2032 will be interpreted by the processor apparatus 2016 as being inputs from the virtual track ball 2032. For instance, an actuation of a sequential plurality of detectors 2061 extending along a particular direction on the touch screen display 2055 in the second area 2083 might be interpreted as a navigational input, a scrolling input, a selection input, and/or another input in the particular direction. Since the user can freely move a finger, for instance, in any direction on the touch screen display 2055, the virtual track ball 2032 is a multiple-axis input device. Other inputs, such as a non-moving actuation of one or more detectors 2061 in the central region of the virtual track ball 2032 could be interpreted by the processor apparatus 2016 as an actuation input of the virtual track ball 2032, such as would be generated by an actuation of the track ball 32 (FIG. 1) of the handheld electronic device 4 in a direction toward the housing 6 thereof. It can be understood that other types of actuations of the detectors 2061 in the second area 2083 can be interpreted as various other inputs without departing from the disclosed and claimed concept.

The handheld electronic device 2004 thus comprises a multiple-axis input device 2032 that is non-mechanical but that still provides the same functional features and advantages as, say, the track ball 32 of the handheld electronic device 4. It is understood that the virtual track ball 2032 is but one example of the many types of multiple-axis input devices that could be employed on the handheld electronic device 2004.

Figure 9:
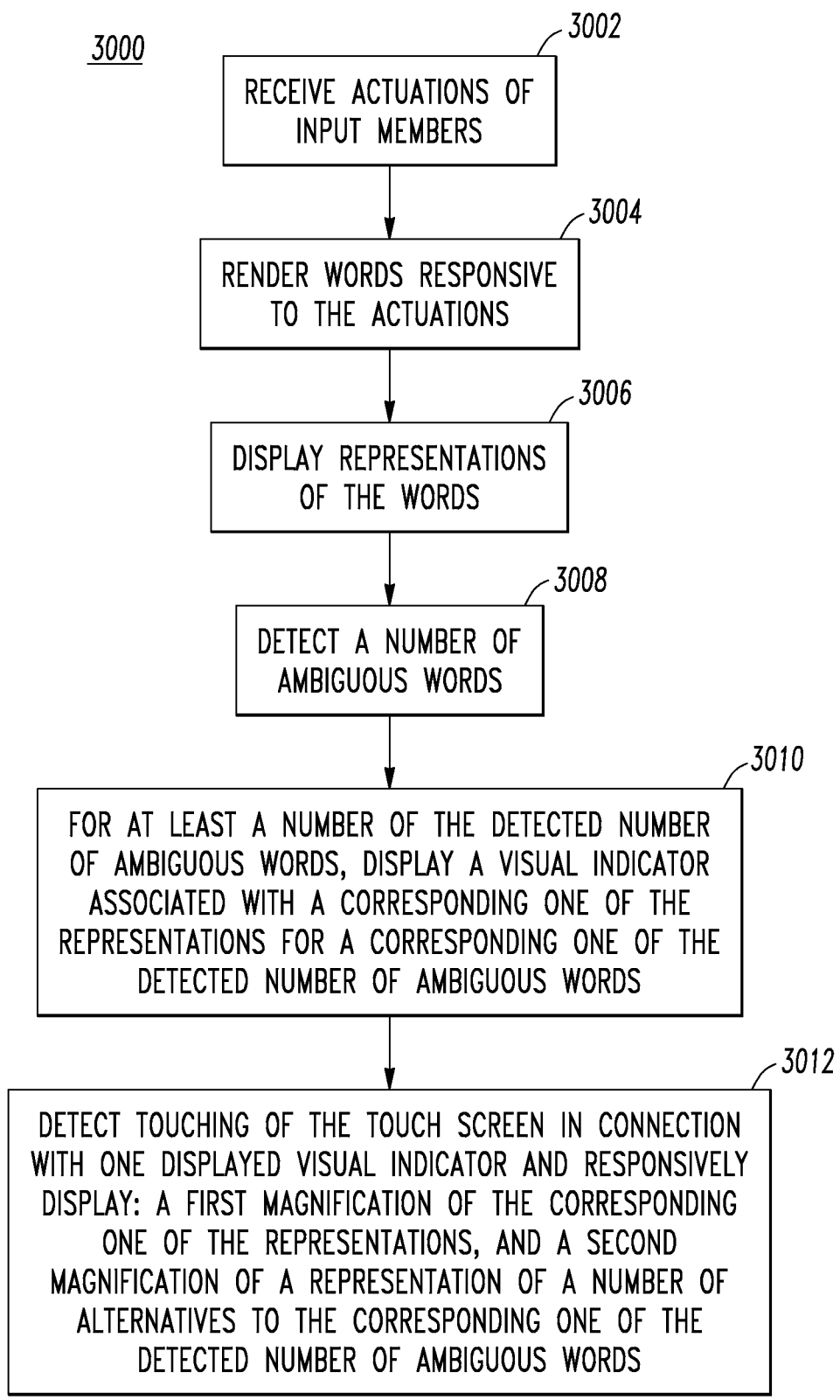
FIG. 9 is a procedure for reviewing or correcting ambiguous words for a handheld electronic device in accordance with embodiments of the disclosed and claimed concept.

Referring to FIG. 9, a procedure 3000 of ambiguous word review or correction for a handheld electronic device, such as 4 or 2004, is shown. At 3002, a plurality of actuations of input members of a handheld electronic device are received. Then, at 3004, a plurality of words are rendered responsive to those actuations of the input members. Next, at 3006, a plurality of representations of those words are displayed at a display apparatus. Then, at 3008, a number of the words, which are ambiguous, are detected. Next, at 3010, for at least a number of the detected number of ambiguous words, a visual indicator is displayed associated with a corresponding one of the representations for a corresponding one of the detected number of ambiguous words at the display apparatus. Finally, at 3012, touching of a touch screen of the handheld electronic device is detected in connection with one of the displayed visual indicator. Preferably, this responsively displays at the display apparatus a first magnification of the corresponding one of the representations, and a second magnification of a representation of a number of alternatives to the corresponding one of the detected number of the words.

Figure 10:
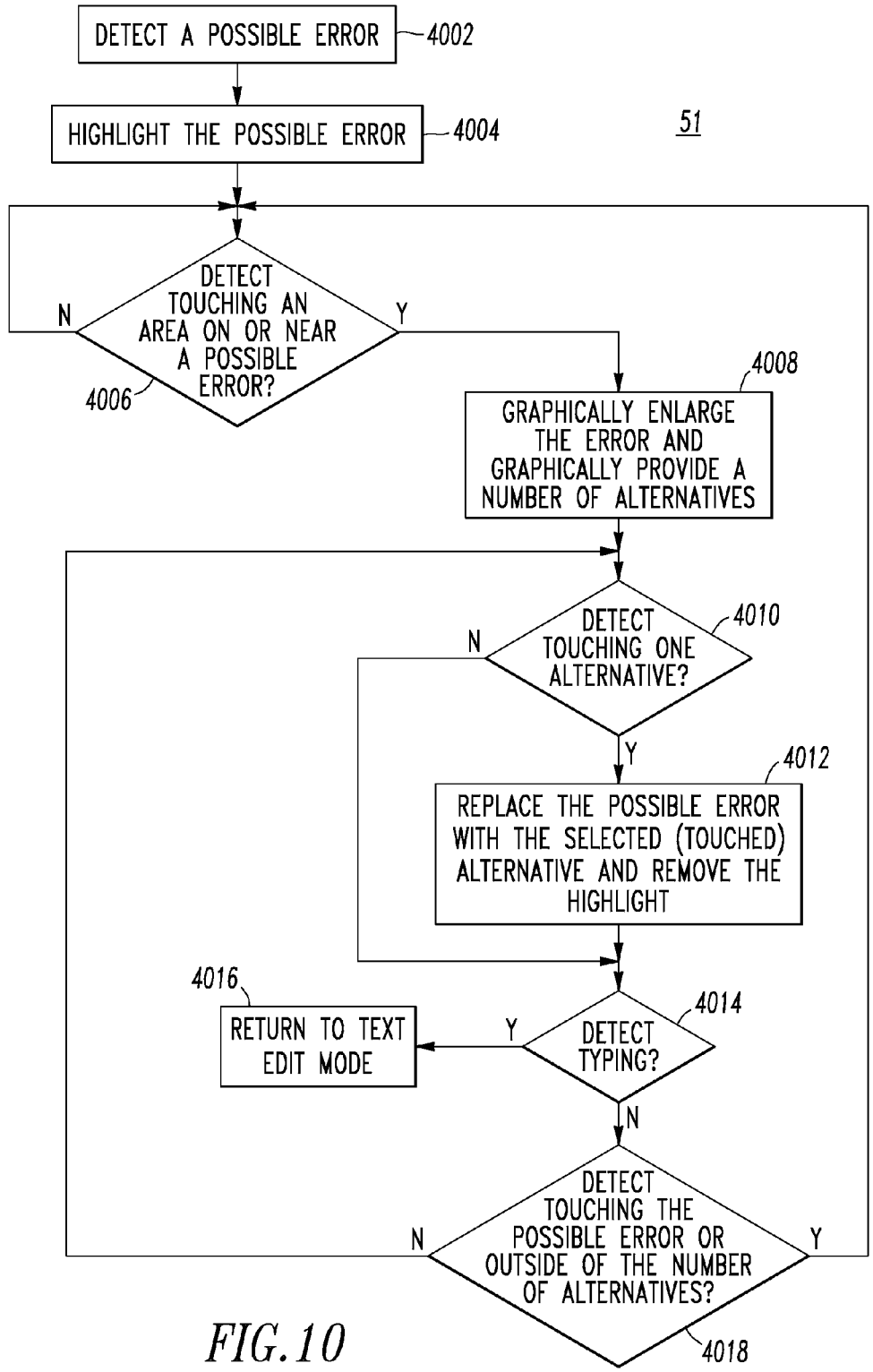
FIG. 10 is a flowchart of a routine executed by the processor of FIG. 2 to review or correct ambiguous words.

FIG. 10 shows the routine 51 of FIG. 2. First, at 4002, the routine 51 detects a possible error (e.g., without limitation, "Are" and "See" are ambiguous; word(s) that could be mistakenly spelled out incorrectly; word(s) that could be used incorrectly in a sentence (e.g., "their", "there" or "they're") as detected by a conventional algorithm) at 4002, and highlights (e.g., without limitation, by underlining "Are") the possible error at 4004. This example detection can be done using one of several known grammar and spelling algorithms. SureType™ algorithms, for example, know if the user entered a key combination that may create an ambiguous word choice (e.g., "see" and "are"). Preferably, combining these algorithms permits the handheld electronic device 4 to detect any suspect word(s). The output of the example visual indicator 54 highlights the possible error. The visual indicator 54, for example, helps the user to easily identify and correct potentially incorrect word(s). For example, in order to help the user identify potentially incorrect word(s), "suspect words" are highlighted on the corresponding display screen 60 (FIG. 1) after the user moves to a different word without hitting the keys 28 corresponding to next, space or backspace.

There are two example types of suspect words. The first type of suspect word arises from key combinations that result in a plurality of device dictionary matches. The second type of suspect word arises from key combinations that have no device dictionary matches. In order to help the user identify the suspect words, they are preferably highlighted on the display screen 60 in a different manner from other words.

Next, at 4006, it is determined through the touch screen 26 (e.g., without limitation, capacitive; resistive; optical) if the user touches an area on or near a possible error. If so, then the possible error is graphically enlarged (e.g., the existing suspect word is magnified to a larger font size) and a number of alternative words are graphically provided (e.g., without limitation, the dialog box 72 (FIG. 4) is displayed) at 4008. On the other hand, in the absence of detecting a user touch, then step 4006 is repeated. After 4008, at 4010, it is determined if the user touches one of the alternative words.

For example, as shown in FIG. 4, the touch screen 26 (shown in hidden line drawing) includes a number of first detecting components 57 structured to detect touching in connection with the example first magnification 56 and a number of second detecting components 59 structured to detect touching in connection with the example second magnification 58.

If it is determined that the user touches one of the alternative words, then, at 4012, the existing possible error is replaced with the selected (touched) alternative word (e.g., "See") and the highlight (e.g., without limitation, underlining) is removed. After 4012, or if there was no touching detected at 4010, it is determined if the user starts to type, at 4014. If so, then the routine 51 returns to a text edit mode at 4016 (e.g., without limitation, the text entry or edit mode of an e-mail preparation application). Otherwise, if there was no typing detected at 4014, then, at 4018, it is determined if the user touches the possible error or outside of the possible number of alternative selection(s). If so, then, step 4006 is repeated to check for touching an area on or near another possible error. On the other hand, if no touch was detected, then step 4010 is repeated to detect touch of the displayed alternative words from step 4008.

Examples 1-12, below, discuss non-limiting alternatives to or applications for the disclosed routine 51, the disclosed "word checker" application 50 and/or user interface(s) therefor.

EXAMPLE 1

In addition to e-mail message applications, such as viewing a received e-mail message or preparing an e-mail message for transmission, it will be appreciated that the disclosed routine 51 is applicable to other applications such as, for example and without limitation, calendar, task list, and other message applications. Hence, the routine 51 is also applicable to the spell checking routine 44, the calendar application 47, the task list application 48, and the e-mail application 49, which can receive and/or send e-mail messages.

EXAMPLE 2

The disclosed routine 51 highlights words on the display 18, such as the example display screen 60, that have a number of alternative words (e.g., as shown in FIGS. 1 and 4) in the device dictionary (not shown) of the example disambiguation routine 45 that can arise from the same input sequence of the keys 28. When the user selects (FIG. 3) (or otherwise scrolls over the highlighted word using the example virtual track ball 2032 of FIG. 7), the number of alternative words are displayed (FIG. 4) using, for example and without limitation, a suitable display, such as the example dialog box 72 or other suitable drop down box (not shown) or popup box (not shown). If the text being viewed is not read-only, then the option to replace that highlighted word with one of the number of alternative words is given (as shown in FIGS. 5 and 6).

Otherwise, if the text being viewed is read-only (e.g., without limitation, associated with a received e-mail message), then no replacement is made.

EXAMPLE 3

The disclosed routine 51 allows a user to check for alternative words in e-mail messages that are received. This is an example of read-only text being viewed. Therefore, if the sender of the e-mail message does not properly check the message before it is sent, then the receiver of that e-mail message has the ability to check for alternative words (as shown in FIGS. 3 and 4).

EXAMPLE 4

The option to highlight ambiguous words may be enabled or disabled. If this option were turned off (disabled), then the user may scroll over a word (e.g., without limitation, using the example virtual track ball 2032 of FIG. 7), and select "Show alternative words" from a menu (not shown). For example, in the example calendar application 47, while viewing a calendar appointment labeled "Pick up the fog", "fog" is highlighted. Upon scrolling over that highlighted word, the displayed drop down box (not shown) lists the word "dog" as an alternative word. Then, the user could choose "dog" and the word "fog" would be replaced.

EXAMPLE 5

It is possible that too many ambiguous words could be highlighted. In that instance, a suitable heuristic routine (not shown) may limit the number of ambiguous words being highlighted. Otherwise, the user could disable the highlighting feature and use the drop down box (not shown) of Example 4 to retrieve any alternative words.

EXAMPLE 6

As an alternative to the disclosed routine 51, a different disambiguation "word checker" application 50 helps to resolve any unintended word replacements. This different application 50 could be used after typing text, such as a draft e-mail message, in order to check for errors before, for example, sending the e-mail message. This is useful because, often, users do not look at the display screen, such as 60 (FIG. 1) while typing text, such as an e-mail message, and, therefore, they don't see when an incorrect word is used. This "word checker" application 50 provides a relatively fast and easy way to check an e-mail message as opposed to doing it manually.

The example "word checker" application 50 iteratively goes through each highlighted word and shows the user the alternative word possibilities. This eliminates the user selection of the possible error in FIG. 3. The user could then choose one of the words as a replacement before going to the next word, or before canceling the "word checker" application 50. Alternatively, the user could ignore the alternative word possibilities for one word before going to the next word, or before canceling the "word checker" application 50.

EXAMPLE 7

Figure 11:
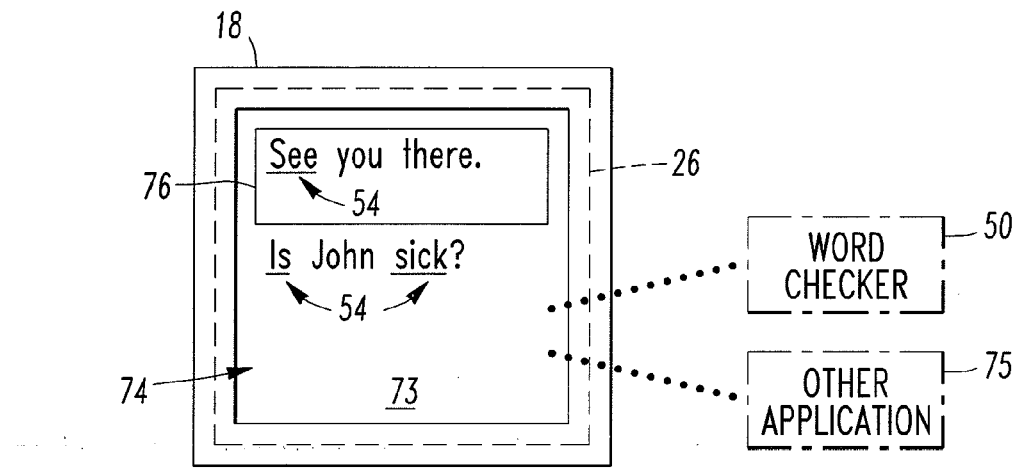
FIGS. 11-15 are display screens for a handheld electronic device in accordance with embodiments of the disclosed and claimed concept.

The "word checker" application 50 could also be used on a block of text, as selected by the user, as opposed to an entire message, for example. Referring to FIG. 11, a display screen 73 is shown in which the actuations of the keys 28 (FIG. 1) and the rendering of the words 74 responsive to the actuations of the keys 28 are implemented by a first application 75 of the handheld electronic device 4. The displaying of the visual indicators 54 and the detecting the touching of the touch screen 26 (shown in hidden line drawing) are implemented by a second different application, such as the example "word checker" application 50 of the handheld electronic device 4. Here, the "word checker" application 50 is similar to the routine 51 of FIG. 10, except that it can select a portion 76 (e.g., a block of user selected text) of the example words 74 or, alternatively, can select all of the words 74.

EXAMPLE 8

Figure 12:
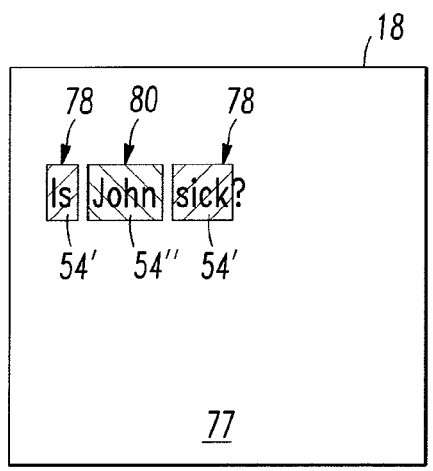

The visual indicator 54 (FIG. 1) can be similar graphically for both misspelled words and ambiguous terms. Referring to FIG. 12, a display screen 77 employs a first number of ambiguous words 78 (two words 78 are shown, although one, three or more such words may be employed) where each of those words has a plurality of dictionary matches (e.g., "Is" or "Us"; "sick" or "suck"). A second number of ambiguous words 80 (one word 80 ("Johx") is shown, although two or more such words may be employed) are employed where none of those words 80 has a dictionary match. A first highlighting 54' is displayed in a first color as the visual indicator for the first number of words 78, and a second highlighting 54" is displayed in a different second color as the visual indicator for the second number of words 80. Here, different colors are preferably used (e.g., without limitation, orange for plural device dictionary matches and yellow for no dictionary matches; red for misspelled (no dictionary matches) and dark yellow or blue for ambiguous (plural device dictionary matches), because red-yellow color blindness and red-blue color blindness are both rare). Preferably, enabling/disabling of ambiguous word marking is provided.

EXAMPLE 9

Figure 13:
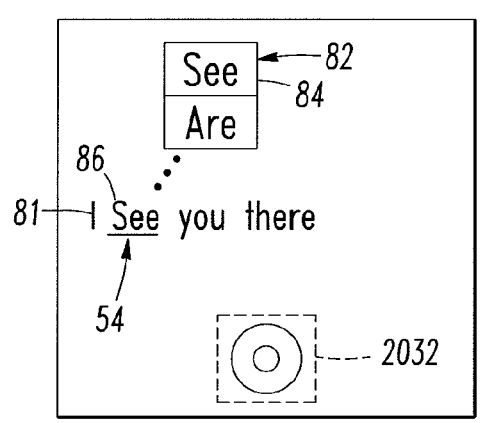

As opposed to direct selection from the touch screen 26 (FIG. 1), when the displayed cursor 81 is positioned at an ambiguous word, a "thumb click" at the virtual track ball 2032 (FIGS. 7, 8 and 13) is employed to bring up a review or correction user interface (UI) display screen 82 in FIG. 13. This UI display screen 82 includes a drop down list box 84 positioned just above or below (e.g., without limitation, above is shown) the ambiguous word 86 (e.g., "See"). This box 84 contains the set of words, which are chosen from a dictionary of words and are ambiguous with respect to the displayed word. The user can scroll up and down within the example list box 84 and "thumb click" at the virtual track ball 2032 to choose the correction ("Are") or the existing word ("See"). Alternatively, the <ESCAPE> key 31 (FIG. 1) will also accept the existing word 86.

EXAMPLE 10

Figure 14:
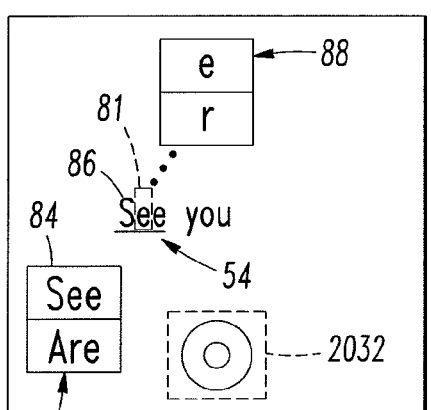

Referring to FIG. 14, another review or correction UI display screen 88 chooses between individual characters of the ambiguous word 86 (e.g., "See") by scrolling the cursor 81 left and right (e.g., using the virtual track ball 2032) over the word 86 and displaying a drop down list box 88 positioned just above or below (e.g., without limitation, above is shown) the ambiguous word 86. If the word choices of the other list box 84 (e.g., including the example "See" and "Are" variants) is below the ambiguous word 86, as shown, then the character choices of the list box 88 are displayed above the word, as shown, and vice versa. This allows the user to choose whatever functionality is appropriate for correcting the ambiguous word 86. Here, the word 86 is highlighted (e.g., underlined 54) and the user positions the cursor 81 at the first "e" of "See", and the example list box 88 displays the alternate characters ("e" and "r"). Scrolling the cursor 81 left (not shown) causes the display of the alternate characters for "S" ("S" and "A"), while scrolling right (not shown) causes the display of the alternate characters for the second "e" ("e" and "r").

EXAMPLE 11

As alternatives to the example visual indicator 54, a wide range of different types of highlighting of word(s) and/or term(s) can be employed. For instance, some of the types of usable highlighting comprise highlighting based upon brightness, size, color, contrast, objects such as circles and boxes surrounding the word(s) and/or term(s), bolding of fonts, italicization or other alteration of fonts, underlining of characters, and other types of highlighting, any one or more of which can be provided alone or in various combinations. The example types of highlighting depicted and described herein are examples only and are not intended to be limiting.

EXAMPLE 12

Figure 15:
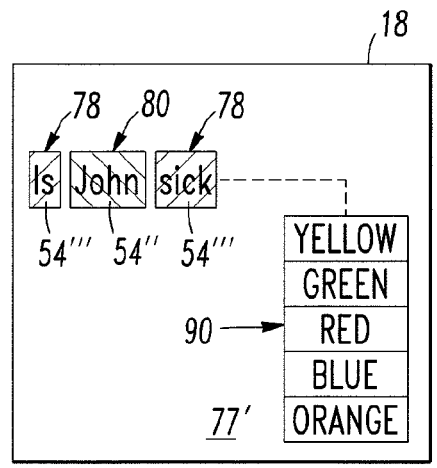

FIG. 15 shows another display screen 77' in which a menu 90 is employed to change the color of the first highlighting 54' of FIG. 12 to a different color highlighting 54'''. It will be appreciated that enabling/disabling of ambiguous word marking and/or selection of a wide range of different visual indicators or highlighting can be provided by a similar menu (not shown).

The disclosed routines 50 and 51 can be used on text that already exists as opposed to the specific word that is currently being typed by the user.

The disclosed routines 50 and 51 allow the receiver of an e-mail message at the handheld electronic device 4 to check for alternative words in such an e-mail message received from another device (not shown).

The disclosed routines 50 and 51 can make possible errors more obvious by highlighting any ambiguous words on the display screen, such as 60, which have a number of alternative words in the device dictionary arising from the same input key sequence.

The disclosed "word checker" application 50 can iteratively check a number of ambiguous words that are displayed in order to reduce the amount of time spent reviewing a message or other text for errors.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of ambiguous word review or correction for a handheld electronic device, the handheld electronic device including a display apparatus and a touch screen apparatus operatively associated with the display apparatus, the method comprising:
   receiving an input of a plurality of selections of keys, each of the keys having at least one character assigned thereto;
   rendering a plurality of words responsive to the plurality of selections of the keys, wherein the plurality of words includes a plurality of previously typed words and a currently typed word;
   displaying at the display apparatus representations of the plurality of words;
   detecting a number of ambiguous words among the plurality of previously typed words, which are not misspelled, wherein each of the detected number of ambiguous previously typed words has two or more dictionary matches, and wherein one of the two or more dictionary matches is displayed at the display apparatus as a representation of the particular ambiguous previously typed word;
   for each of the detected number of ambiguous previously typed words, displaying a visual indicator;
   detecting touching of the touch screen in connection with one of the displayed visual indicators associated with an ambiguous previously typed word;
   responsive to the detected touching, displaying at the display apparatus:
      (a) a first magnification of a representation of the ambiguous previously typed word, and
      (b) a second magnification of a representation of a number of alternative words to the ambiguous previously typed word;
   detecting touching of the touch screen in connection with one of displayed characters of the ambiguous previously typed word; and
   responsive to the detected touching of the touch screen in connection with the one of the displayed characters of the ambiguous previously typed word, displaying at the display apparatus a third magnification of a representation of a number of alternative characters to the one of the displayed characters of the ambiguous previously typed word, wherein the third magnification is displayed at a location different from both locations where the first magnification and the second magnification are displayed.

2. The method of claim 1 further comprising:
detecting touching of the touch screen in connection with one of the alternative words and responsively displaying a representation of the alternative word in place of the representation of the ambiguous previously typed word.

3. The method of claim 2 further comprising:
removing the visual indicator after the responsively displaying the representation the alternative word in place of the representation of the ambiguous previously typed word.

4. The method of claim 1 further comprising:
displaying highlighting as the displaying the visual indicator.

5. The method of claim 4 further comprising:
displaying underlining as the displayed highlighting.

6. The method of claim 1 further comprising:
displaying highlighting in one of a number of different colors as the displaying the visual indicator.

7. The method of claim 1 further comprising:
employing a first number of the plurality of previously typed words, which are ambiguous, each of the first number of the plurality of previously typed words having a plurality of dictionary matches;
employing a second number of the plurality of previously typed words, which are ambiguous, each of the second number of the plurality of previously typed words having no dictionary matches;
displaying first highlighting in a first color as the displaying the visual indicator for the first number of the plurality of previously typed words; and
displaying second highlighting in a different second color as the displaying a visual indicator for the second number of the plurality of previously typed words.

8. The method of claim 1 further comprising:
displaying a selectable and changeable field as the displayed visual indicator associated with the one of the representations.

9. The method of claim 1 further comprising:
forming at least part of an e-mail message with the representations of the plurality of words.

10. The method of claim 2, wherein the representation of the number of alternative words to the ambiguous previously typed word is displayed in a dialog box.

11. The method of claim 1 further comprising:
displaying the visual indicator after composition of the plurality of previously typed words, wherein the plurality of previously typed words includes a phrase, a sentence, a paragraph or an entire composition.

12. The method of claim 1 further comprising:
displaying a dialog box including both of the first magnification of the representation of the ambiguous previously typed word, and the second magnification of the representation of the number of alternative words to the ambiguous previously typed word.

13. The method of claim 1 further comprising:
displaying the visual indicator and detecting the touching of the touch screen in a calendar application of the handheld electronic device.

14. The method of claim 1 further comprising:
displaying the visual indicator and detecting the touching of the touch screen in a task list application of the handheld electronic device.

15. The method of claim 1 further comprising:
displaying the visual indicator and detecting the touching of the touch screen for ambiguous words included in an e-mail message received in a read-only manner.

16. The method of claim 1 further comprising:
displaying representation of alternative words for ambiguous words included in an e-mail message received in a read-only manner.

17. The method of claim 1 further comprising:
displaying the visual indicator and detecting the touching of the touch screen in an e-mail application of the handheld electronic device.

18. The method of claim 1 further comprising:
receiving the plurality of selections of the keys and rendering the plurality of words responsive to the plurality of selections in a first application of the handheld electronic device; and
displaying the visual indicator and detecting the touching of the touch screen in a second different application of the handheld electronic device.

19. The method of claim 18 further comprising:
selecting a portion of the representations of the plurality of words in the second different application.

20. The method of claim 18 further comprising:
selecting all of the representations of the plurality of words in the second different application.

21. A handheld electronic device comprising:
a display apparatus;
a touch screen apparatus operatively associated with the display apparatus; and
a processor apparatus configured to:
  receive a plurality of selections of keys having at least one character assigned thereto,
  render a plurality of words responsive to the plurality of selections of the keys, wherein the plurality of words includes a plurality of previously typed words and a currently typed word,
  display at the display apparatus representations of the plurality of words,
  detect a number of ambiguous words among the plurality of previously typed words, which are not misspelled, wherein each of the detected number of ambiguous previously typed words has two or more dictionary matches, and wherein one of the two or more dictionary matches is displayed at the display apparatus as a representation of the particular ambiguous previously typed word,
  for each of the detected number of ambiguous previously typed words, display a visual indicator, and
  detect touching of the touch screen in connection with one of the displayed visual indicators associated with an ambiguous previously typed word,
  wherein the processor apparatus is further configured, responsive to the detected touching, to display:
    (a) a first magnification of a representation of the ambiguous previously typed word, and
    (b) a second magnification of a representation of a number of alternative words to the ambiguous previously typed word,
  wherein the processor apparatus is further configured to:
    detect touching of the touch screen in connection with one of displayed characters of the ambiguous previously typed word; and
    responsive to the detected touching of the touch screen in connection with the one of the displayed characters of the ambiguous previously typed word, display at the display apparatus a third magnification of a representation of a number of alternative characters to the one of the displayed characters of the ambiguous previously typed word, wherein the third magnification is displayed at a location different from both locations where the first magnification and the second magnification are displayed.

22. The handheld electronic device of claim 21, wherein the processor apparatus further comprises:
a plurality of detectors structured to detect touching of the touch screen in connection with one of the alternative words and responsively display a representation of the alternative word in place of a representation of the ambiguous previously typed word.

23. The handheld electronic device of claim 21, wherein the touch screen apparatus comprises:
a detecting component structured to detect touching in connection with one of the first magnification and the second magnification by the touch screen apparatus.

24. The handheld electronic device of claim 21, wherein the display apparatus comprises a virtual track ball; and
wherein the processor apparatus is further structured to respond to selection of one of the first magnification and the second magnification responsive to the virtual track ball.

25. The handheld electronic device of claim 24 wherein the processor apparatus is further structured to edit the one of the representations responsive to the virtual track ball.

* * * * *